US012718406B2

(12) United States Patent
Eich et al.

(10) Patent No.: US 12,718,406 B2
(45) Date of Patent: Aug. 25, 2026

(54) METHOD AND SYSTEM FOR ASCERTAINING THE POSITION AND ALIGNMENT OF A VIRTUAL CAMERA OF A SURROUNDINGS MONITORING SYSTEM

(71) Applicant: Continental Autonomous Mobility Germany GmbH, Ingolstadt (DE)

(72) Inventors: Markus Eich, Ulm (DE); Ulrich Schaub, Ulm (DE); Wolfgang Fey, Bodolz (DE)

(73) Assignee: Continental Autonomous Mobility Germany GmbH, Ingolstadt (DE)

( * ) Notice: Subject to any disclaimer, the term of this patent is extended or adjusted under 35 U.S.C. 154(b) by 234 days.

(21) Appl. No.: 18/707,505

(22) PCT Filed: Oct. 12, 2022

(86) PCT No.: PCT/DE2022/200234
§ 371 (c)(1),
(2) Date: May 3, 2024

(87) PCT Pub. No.: WO2023/078514
PCT Pub. Date: May 11, 2023

(65) Prior Publication Data
US 2026/0162299 A1 Jun. 11, 2026

(30) Foreign Application Priority Data
Nov. 4, 2021 (DE) ..................... 10 2021 212 445.3

(51) Int. Cl.
*G06T 7/73* (2017.01)
*B60R 1/27* (2022.01)
(Continued)

(52) U.S. Cl.
CPC .................. *G06T 7/74* (2017.01); *B60R 1/27* (2022.01); *G06T 7/337* (2017.01); *G06T 19/00* (2013.01);
(Continued)

(58) Field of Classification Search
CPC ........... G06T 7/74; G06T 7/337; G06T 19/00; G06T 2207/30244; G06T 2207/30252;
(Continued)

(56) References Cited

U.S. PATENT DOCUMENTS

2010/0156906 A1* 6/2010 Montgomery ........ G06T 15/205 345/427
2013/0169792 A1* 7/2013 Mathes .............. B62D 15/0275 348/119
(Continued)

FOREIGN PATENT DOCUMENTS

CN 112793586 A * 5/2021 ........ B60W 60/0015
EP 3683102 A1 7/2020
(Continued)

OTHER PUBLICATIONS

German Search Report dated Mar. 3, 2022 for the priority German Patent Application No. 10 2021 212 445.3.
(Continued)

*Primary Examiner* — Maurice L. McDowell, Jr.
(74) *Attorney, Agent, or Firm* — Fitch, Even, Tabin & Flannery LLP

(57) ABSTRACT

The present disclosure relates to a method for ascertaining a virtual camera position and camera alignment in order to allow the surroundings of a vehicle to be represented on a display unit of the vehicle on the basis of this virtual camera position and camera alignment.

15 Claims, 3 Drawing Sheets

(51) Int. Cl.

| | |
|---|---|
| ***G06T 7/33*** | (2017.01) |
| ***G06T 19/00*** | (2011.01) |
| ***G06V 10/74*** | (2022.01) |
| ***G06V 20/58*** | (2022.01) |

(52) U.S. Cl.
CPC ............ *G06V 10/761* (2022.01); *G06V 20/58* (2022.01); *B60R 2300/105* (2013.01); *B60R 2300/303* (2013.01); *G06T 2207/30244* (2013.01); *G06T 2207/30252* (2013.01)

(58) Field of Classification Search
CPC ................ B60R 1/27; B60R 2300/105; B60R 2300/303; G06V 10/761; G06V 20/58
See application file for complete search history.

(56) References Cited

U.S. PATENT DOCUMENTS

| | | | | |
|---|---|---|---|---|
| 2016/0203377 | A1* | 7/2016 | Irie | H04N 23/90<br>348/118 |
| 2016/0283081 | A1* | 9/2016 | Johnston | H04N 23/695 |
| 2017/0341582 | A1* | 11/2017 | Friebe | B60R 1/28 |
| 2018/0246515 | A1 | 8/2018 | Iwama | |
| 2019/0164430 | A1 | 5/2019 | Nix | |
| 2019/0325650 | A1* | 10/2019 | Milz | H04N 23/54 |

FOREIGN PATENT DOCUMENTS

| | | | |
|---|---|---|---|
| JP | 2018518863 | A | 7/2018 |
| JP | 2020519037 | A | 6/2020 |
| JP | 2021510221 | A | 4/2021 |
| KR | 20200071842 | A | 6/2020 |
| WO | 2017192144 | A1 | 11/2017 |
| WO | 2019038914 | A1 | 2/2019 |

OTHER PUBLICATIONS

The International Search Report and the Written Opinion of the International Searching Authority mailed on Dec. 22, 2022 for the PCT Application No. PCT/DE2022/200234 to which this application claims priority.

Notice of Reasons for Refusal mailed on Jan. 22, 2025 for the counterpart Japanese Patent Application No. 2024 521287 and machine translation of same.

Decision to Grant a Patent mailed on May 28, 2025 for the counterpart Japanese Patent Application No. 2024 521287and machine translation of same.

Indian Patent Office, First Examination Report dated Apr. 24, 2026, from related Indian Patent Application No. 202417035397, 11 pages.

* cited by examiner

METHOD AND SYSTEM FOR ASCERTAINING THE POSITION AND ALIGNMENT OF A VIRTUAL CAMERA OF A SURROUNDINGS MONITORING SYSTEM

CROSS-REFERENCE TO RELATED APPLICATIONS

The present application is a National Stage Application under 35 U.S.C. § 371 of International Patent Application No. PCT/DE2022/200234 filed on Oct. 12, 2022, and claims priority from German Patent Application No. 10 2021 212 445.3 filed on Nov. 4, 2021, in the German Patent and Trademark Office, the disclosures of which are herein incorporated by reference in their entireties.

TECHNICAL FIELD

The invention relates to the field of environment monitoring systems of vehicles. In particular, the invention relates to a method and a system for ascertaining the position and alignment of a virtual camera of an environment monitoring system.

BACKGROUND

Environment monitoring systems in vehicles are in principle known. In particular, environment monitoring systems which make possible a three-dimensional, perspective 360° all-round view around the vehicle, so-called 3D surround view systems, are known. In the case of such systems, the items of image information of multiple cameras are linked to produce an all-round view representation and mapped onto a three-dimensional surface in order to obtain a spatially perspective representation. In the case of the known systems, the spatially perspective representation of the surroundings of the vehicle can be carried out from different perspectives. Thus, the position and alignment of a virtual camera, i.e., the position and viewing direction from which a virtual viewer sees the scene, can be changed so that different regions of the surroundings of the vehicle can be viewed. In particular, the position and alignment of the virtual camera can be selected, for example, such that both a surrounding region and the vehicle in this surrounding region can be recognized.

Up to now, the position and alignment of the virtual camera in environment monitoring systems have had to be suitably selected in each case by the user depending on the situation in order to be able to represent a relevant region on a display unit of the vehicle. As a result, the vehicle user is distracted from controlling the vehicle, which is perceived as disadvantageous and can lead to accidents.

SUMMARY

Proceeding herefrom, it is an object of the present disclosure to indicate a method which makes it possible to automatically ascertain the position and alignment of a virtual camera of an environment monitoring system.

The object is addressed by a method having features of the independent Claim 1. Example embodiments are the subject-matter of the subclaims. A system for ascertaining the position and alignment of a virtual camera of an environment monitoring system is the subject-matter of the alternative, independent Claim 9.

According to a first aspect, a method for ascertaining the position and alignment of a virtual camera of an environment monitoring system is disclosed. On the basis of this virtual camera position and camera alignment, the surroundings information of a vehicle is pictured on a display unit of the vehicle. In other words, the perspective from which the surroundings information is viewed is defined by ascertaining the position and alignment of a virtual camera. The method includes the following steps.

Initially, the vehicle surroundings are detected by means of multiple cameras of the vehicle and current vehicle surroundings information is generated on the basis of the information of the cameras. In particular, the items of image information provided by the cameras are linked to one another such that this makes possible a 360° all-round representation of the current vehicle surroundings.

In addition, a storage unit on which multiple data sets are stored is provided. The data sets each includes stored vehicle surroundings information which has been detected by means of multiple cameras of the vehicle. In addition, the data sets each includes information on the virtual camera position and camera alignment, so that an assignment of stored vehicle surroundings information to the virtual camera position and camera alignment is carried out by way of the respective data set. The data sets may be generated by the driver in driving situations by storing a selected virtual camera position and camera alignment together with the vehicle surroundings information.

Subsequently, the currently detected vehicle surroundings information is compared with the vehicle surroundings information of at least one data set which is stored in the storage unit.

Thereafter, at least one similarity parameter relating to at least one data set is established. The similarity parameter indicates, in each case, the degree of similarity of the currently detected vehicle surroundings information to the stored vehicle surroundings information of the respective data set.

Finally, the similarity parameter is compared with a threshold. If the similarity parameter is greater than a specified threshold, information on the virtual camera position and camera alignment of the data set, which contains the stored vehicle surroundings information, is read. In addition, the virtual camera position and the camera alignment are ascertained on the basis of the read information on the virtual camera position and camera alignment, i.e., the surroundings information is represented from a perspective which is ascertained by the read information on the virtual camera position and camera alignment.

The method has the technical advantage that the environment monitoring system may automatically select a virtual camera position and virtual camera alignment for vehicle surroundings, in which a virtual camera position and virtual camera alignment have already been ascertained in the past and the vehicle surroundings are represented on the display unit of the vehicle on the basis of the virtual camera position and virtual camera alignment. As a result, no driver interaction with the environment monitoring system is necessary if the driver would like to reuse the virtual camera position and virtual camera alignment ascertained in the past. As a result, the driver can better concentrate on the driving maneuver and is not distracted by interacting with the environment monitoring system, which increases the user-friendliness of the driver assistance system.

According to an example embodiment, comparing the current vehicle surroundings information with the stored vehicle surroundings information includes a determination of image similarities and a matching of image features between the current vehicle surroundings information and the stored vehicle surroundings information. As a result, it may be established by image processing whether the vehicle is located in a position for which information on the virtual camera position and virtual camera alignment is already saved.

According to an example embodiment, multiple similarity parameters relating to multiple different data sets are established. The maximum similarity parameter is determined, which indicates the greatest correspondence between the current vehicle surroundings information and the stored vehicle surroundings information. The maximum similarity parameter is then used to compare thresholds. In order to ascertain the virtual camera position and virtual camera alignment, the information on the virtual camera position and camera alignment of that data set which contains the stored vehicle surroundings information which led to the maximum similarity parameter is read. As a result, the vehicle surroundings information of multiple data sets may be examined and that data set having the stored vehicle surroundings information which has the greatest correspondence with or similarity to the current vehicle surroundings information may be used in order to ascertain the virtual camera position and virtual camera alignment.

According to an example embodiment, the data sets each has position-related surroundings information. By comparing the current vehicle surroundings information with the stored vehicle surroundings information, establishing the at least one similarity parameter and comparing the similarity parameter with the threshold, it is determined whether the vehicle is located in a vehicle position regarding which a virtual camera position and a virtual camera alignment have already been ascertained. It is therefore determined by the camera-based surroundings detection and the comparison with known surroundings information whether a correspondence exists with known vehicle surroundings for which a viewing perspective has already been ascertained in the past.

According to an example embodiment, the vehicle has a sensor-based positioning system, for example a GPS-based positioning system. The data sets each has position data which have been provided in the past by the positioning system. The position data indicate the geographical position in which the respective stored vehicle surroundings information has been detected. The position data are, for example, geographical coordinates of a global coordinate system. It is therefore possible to estimate the relevance of the respective data set by way of the current position information of the positioning system and the comparison of the current position information with the position data of the data sets, without having to perform a comparison of the current vehicle surroundings information with the stored vehicle surroundings information.

According to an example embodiment, position information is determined by means of the sensor-based positioning system. This position information is compared with the position data stored in the data sets. By comparing the position information with the position data stored in the data sets, the data sets are restricted and, indeed, in terms of for which data sets or stored vehicle surroundings information contained in the respective data sets, a determination of a similarity parameter is to be carried out in each case. A sensor-based positioning system has an inaccuracy or fuzziness in the position determination which does not make it possible to determine the position exactly. The inaccuracy or fuzziness is typically in the range of a few meters. No exact position determination of the vehicle can therefore be achieved by the sensor-based positioning system, but it is possible to support the visual position determination, which is based on the stored data sets, by the sensor-based positioning system and indeed to the effect that the comparison of the current vehicle surroundings information with the stored vehicle surroundings information can be reduced to the relevant data sets which have been acquired in the region of the current vehicle position. As a result, the computing outlay for the comparison can be reduced in a decisive manner.

According to an example embodiment, a computing unit of the vehicle generates, from the information provided by the cameras on the basis of the virtual camera position and the camera alignment, three-dimensional surroundings information which is represented on the display unit of the vehicle as spatially perspective surroundings information. The virtual camera position and the camera alignment specify the perspective from which the surroundings information is viewed, and the sector of the surroundings information represented on the display unit. As a result, the surroundings information can be represented in a natural and user-friendly manner by the environment detection system.

According to an example embodiment, the spatially perspective surroundings information contains a perspective view of the vehicle itself. For example, the surrounding region can be perspectively represented beyond the vehicle itself, i.e., not only the surroundings of the vehicle itself in the perspective surroundings information, but also the position or embedding of the vehicle in the surroundings can be recognized. As a result, better driver support by the environment detection system is made possible, since the driver can better recognize how the vehicle is positioned relative to the surroundings.

According to a further aspect, the present disclosure relates to a system for ascertaining the position and alignment of a virtual camera of an environment monitoring system. The system includes multiple cameras distributed around a vehicle, a computing unit for processing the information which is provided by the cameras, a storage unit and a display unit which is designed to represent surroundings information of the vehicle. The computing unit is configured to perform the following steps of:

- detecting the vehicle surroundings by means of multiple cameras of the vehicle and generating current vehicle surroundings information on the basis of the information of the cameras;
- storing multiple datasets in the storage unit, wherein the data sets each comprise stored vehicle surroundings information which has been detected by means of multiple cameras of the vehicle, and information on the virtual camera position and camera alignment assigned to this stored vehicle surroundings information;
- comparing the current vehicle surroundings information with the stored vehicle surroundings information of at least one data set;
- establishing at least one similarity parameter relating to at least one data set, wherein the similarity parameter indicates, in each case, the degree of similarity of the current vehicle surroundings information to the stored vehicle surroundings information of the respective data set;
- if the similarity parameter is greater than a specified threshold, reading the information on the virtual camera position and camera alignment of the data set which contains the stored vehicle surroundings information, and ascertaining the virtual camera position and the camera alignment on the basis of the read information on the virtual camera position and camera alignment.

According to an example embodiment of the system, the computing unit is designed to compare the current vehicle surroundings information with the stored vehicle surroundings information, to determine image similarities and to match image features between the current vehicle surroundings information and the stored vehicle surroundings information. As a result, it can be established by image processing whether the vehicle is located in a position for which information on the virtual camera position and virtual camera alignment is already saved.

According to an example embodiment of the system, the computing unit is designed to establish multiple similarity parameters regarding multiple different data sets, to determine the maximum similarity parameter which indicates the greatest correspondence between the current vehicle surroundings information and the stored vehicle surroundings information, to use the maximum similarity parameter to compare thresholds and to read the information on the virtual camera position and camera alignment of the data set which contains the stored vehicle surroundings information which led to the maximum similarity parameter. As a result, the vehicle surroundings information of multiple data sets may be examined and that data set having the stored vehicle surroundings information which has the greatest correspondence with or similarity to the current vehicle surroundings information can be used in order to ascertain the virtual camera position and virtual camera alignment.

According to an example embodiment of the system, the vehicle has a sensor-based positioning system. The computing unit is configured to store position data provided in each case by the positioning system in the data sets, which position data indicate the geographical position in which the respective stored vehicle surroundings information has been detected. The position data indicate the geographical position in which the respective stored vehicle surroundings information has been detected. The position data are, for example, geographical coordinates of a global coordinate system. It is therefore possible to estimate the relevance of data sets by way of the current position information of the positioning system without having to perform a comparison of the current vehicle surroundings information with the stored vehicle surroundings information.

According to an example embodiment of the system, the sensor-based positioning system is designed to determine geographical position information. The computing unit is configured to compare the geographical position information with the position data stored in the data sets and, by comparing the position information with the position data stored in the data sets, to restrict the data sets for which a determination of a similarity parameter is carried out in each case. As a result, the computing outlay for the comparison of the current vehicle surroundings information with the stored vehicle surroundings information may be reduced in a decisive manner.

According to an example embodiment of the system, the computing unit is configured to generate, from the information provided by the cameras on the basis of the virtual camera position and the camera alignment, three-dimensional surroundings information which is represented on the display unit of the vehicle as spatially perspective surroundings information. As a result, the surroundings information may be represented by the environment detection system in a natural and user-friendly manner.

According to an example embodiment of the system, the computing unit is configured to represent a perspective view of the vehicle itself in the spatially perspective surroundings information. As a result, better driver support by the environment detection system is made possible, since the driver can better recognize how the vehicle is positioned relative to the surroundings.

Within the meaning of the invention, the expressions "approximately," "substantially" or "roughly" mean deviations from the exact value in each case by +/−10%, such as by +/−5%, and/or deviations in the form of changes which are insignificant to the function.

Further developments, advantages and possible applications of the invention are set out by the following description of example embodiments and by the figures. All of the features described and/or pictured per se or in any combination are fundamentally the subject-matter of the invention, irrespective of their combination in the claims or references back thereto. The content of the claims is also made an integral part of the description.

DESCRIPTION OF THE DRAWINGS

The present disclosure is explained in more detail below with reference to the figures of exemplary embodiments, wherein.

DETAILED DESCRIPTION

Figure 1:
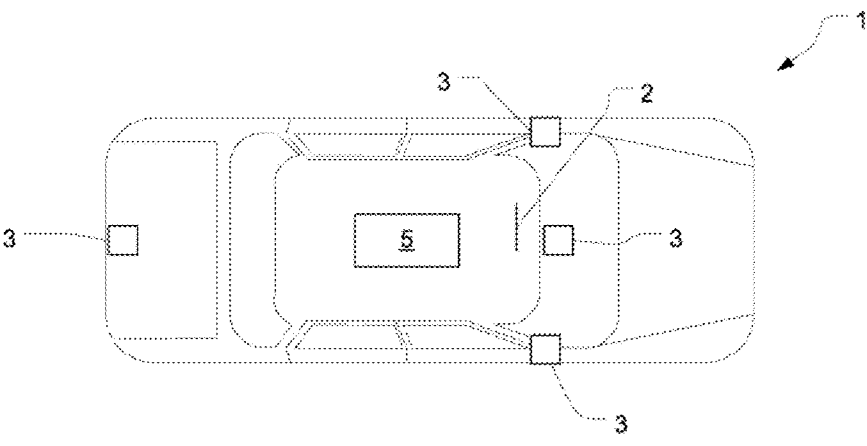
FIG. 1 shows, by way of example, a schematic top-view representation of a vehicle which has a system for representing surroundings information on a display unit.

FIG. 1 shows, by way of example and schematically, a vehicle 1 which has a system for the three-dimensional representation of the region surrounding the vehicle 1 on a display unit 2, also referred to below as a 3D surround view system. The display unit 2 is in particular provided in the vehicle interior and serves to support the driver during driving maneuvers, for example when reversing or parking in a parking space.

The vehicle 1 has multiple cameras 3 which are provided on the outside of the vehicle 1 and distributed around the circumference of the vehicle 1. For example, the vehicle 1 may have a front camera, a rear camera and at least one side camera on each side. The cameras 3 may be arranged and configured such that by stitching the images provided by the respective cameras 3, a 360° representation of the region surrounding the vehicle 1 becomes possible.

The vehicle 1 may be designed to generate, from the items of image information provided by the at least two cameras 3, three-dimensional surroundings information which is represented on the display unit 2 as spatially perspective surroundings information.

Figure 2:
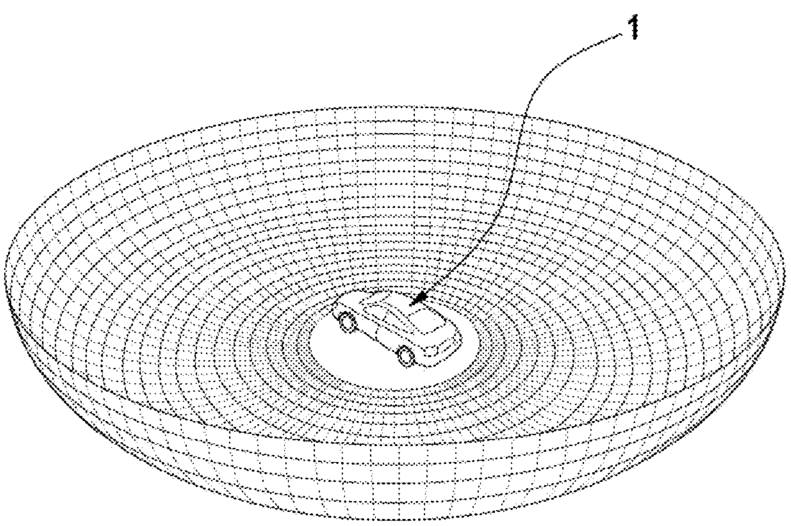
FIG. 2 shows, by way of example, the representation of a hemisphere as a 3D bowl on which surroundings information in the region surrounding the vehicle can be mapped in order to be able to represent the surroundings information perspectively.

FIG. 2 shows, by way of example, a perspective representation of the three-dimensional space in the region surrounding the vehicle 1. Such a representation is referred to, for example, as a 3D bowl. From the items of image information provided by the cameras 3, spatially perspective surroundings information can be calculated by the computing unit 5 provided in the vehicle. In the case of this spatially perspective surroundings information, the vehicle 1 itself or its contour may preferably be recognized. Unlike a top-view representation (bird's eye view), this type of perspective all-round view representation makes it possible to view the region surrounding the vehicle 1 from a specific reference point or viewing point perspectively, which is referred to below as the camera position. The camera position may be varied, i.e., the virtual position from which the vehicle 1 and its surroundings are viewed may be changed (virtual movement in the 3D bowl). This achieves a more realistic representation of the region surrounding the vehicle 1.

In addition, the camera alignment may be changed from an ascertained camera position, i.e., the angle at which the vehicle 1 or the surroundings of the vehicle 1 is/are viewed from the camera position.

The vehicle 1 is designed to automatically ascertain the camera position and the camera alignment and, indeed, in that the vehicle 1 has a visual surroundings recognition system which is configured to discover whether the vehicle 1 is currently located in a position regarding which a camera position and a camera alignment have already been ascertained by the vehicle user. The visual surroundings recognition system utilizes the items of image information provided by the cameras 3, generates therefrom current vehicle surroundings information and compares this with stored vehicle surroundings information for which the vehicle user has already ascertained a camera position and a camera alignment.

Figure 3:
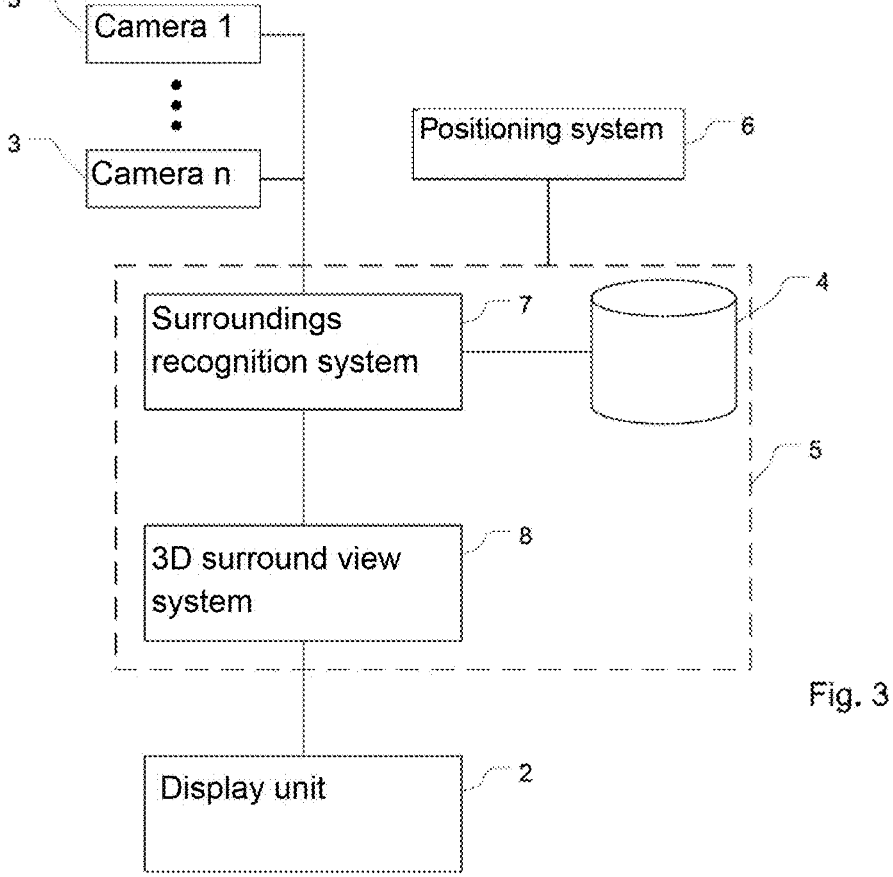
FIG. 3 shows, by way of example, a schematic block diagram of a system for ascertaining the position and alignment of a virtual camera for perspectively representing surroundings information in the region surrounding the vehicle.

As schematically indicated in FIG. 1, the vehicle includes a computing unit 5, by means of which the camera position and the camera alignment are automatically ascertained. FIG. 3 shows, in an example schematic block diagram, the construction of the system for automatically ascertaining the camera position and the camera alignment. A computing unit of the vehicle 5 implements, for example, a visual surroundings recognition system 7 and a 3D surround view system 8. The surroundings recognition system 7 is coupled to the cameras 3 of the vehicle 1 and receives items of image information from the cameras. The items of image information of the individual cameras 3 are subsequently merged and further processed to produce current vehicle surroundings information. For example, the items of image information of the individual cameras 3 may be linked to one another such that they are added up to produce a 360° all-round view.

The surroundings recognition system 7 is coupled to a storage unit 4. The storage unit 4 is designed to store one or multiple data sets. A data set includes vehicle surroundings information which has been established at a past time on the basis of the items of image information of the cameras 3. The vehicle surroundings information may in particular also have been obtained by the surroundings recognition system 7 by stitching items of image information of multiple cameras 3. In addition, the data sets each has information on the virtual camera position and the virtual camera alignment which have already been used by a vehicle user in the current vehicle surroundings. In other words, the storage unit 4 therefore serves to store user-related virtual camera position and virtual camera alignment information at determined locations which are, for example, visited several times by the vehicle user.

The surroundings recognition system 7 is configured to recognize, by comparing the currently detected vehicle surroundings information with stored vehicle surroundings information which is stored in the data sets in the storage unit 4 of the vehicle 1, whether the vehicle 1 is located in a position regarding which a virtual camera position and a camera alignment have already been ascertained by the vehicle user.

The currently detected vehicle surroundings information is compared in more detail with the stored vehicle surroundings information by determining image similarities and/or feature correspondences. On the basis of the comparison of the detected vehicle surroundings information with the stored vehicle surroundings information, a similarity parameter is determined, which indicates the probability that the currently detected vehicle surroundings information has been acquired from the same vehicle position as the stored vehicle surroundings information. If the similarity parameter exceeds a specified threshold, it is assumed that the current vehicle position is the same position in which the stored vehicle surroundings information was acquired. In this case, the information on the virtual camera position and camera alignment assigned to the stored vehicle surroundings information is read from the storage unit 4 and utilized to ascertain the virtual camera position and camera alignment in the current vehicle position on the basis thereof.

The read virtual camera position and the camera alignment are in particular transferred to the 3D surround view system 8 which, on the basis thereof, initiates a representation of the current vehicle surroundings information on the display unit 2 of the vehicle 1.

According to an example embodiment, the vehicle 1 has a sensor-based positioning system 6. The sensor-based positioning system 6 may be a satellite-protected GPS system (GPS: Global Positioning System), for example. It is possible to establish position information of the vehicle 1 by means of the positioning system 6. This position information is, in particular, a coordinate in a global coordinate system which indicates where the vehicle is currently located.

The position information may be used to support the visual position determination which is based on pictorial surroundings information. In particular, it is possible to restrict data sets which are to be examined in terms of a correspondence of current vehicle surroundings information with stored vehicle surroundings information. In addition to the stored vehicle surroundings information, the data sets may thus also have position information which has been obtained by the positioning system 6. Prior to comparing the current vehicle surroundings information with stored vehicle surroundings information, the data sets originating from positions in the vicinity of the current position of the vehicle 1 may therefore be determined, and the stored vehicle surroundings information of those data sets may be simply compared with the current vehicle surroundings information which was acquired in a position which is in the proximity of the current position of the vehicle 1.

The data sets stored in the storage unit 4 may be assigned to a profile of a vehicle user. It is therefore possible to store the position and alignment of the virtual camera depending on the vehicle user and to then use it depending on the current user profile when ascertaining the position and alignment of the virtual camera.

Figure 4:
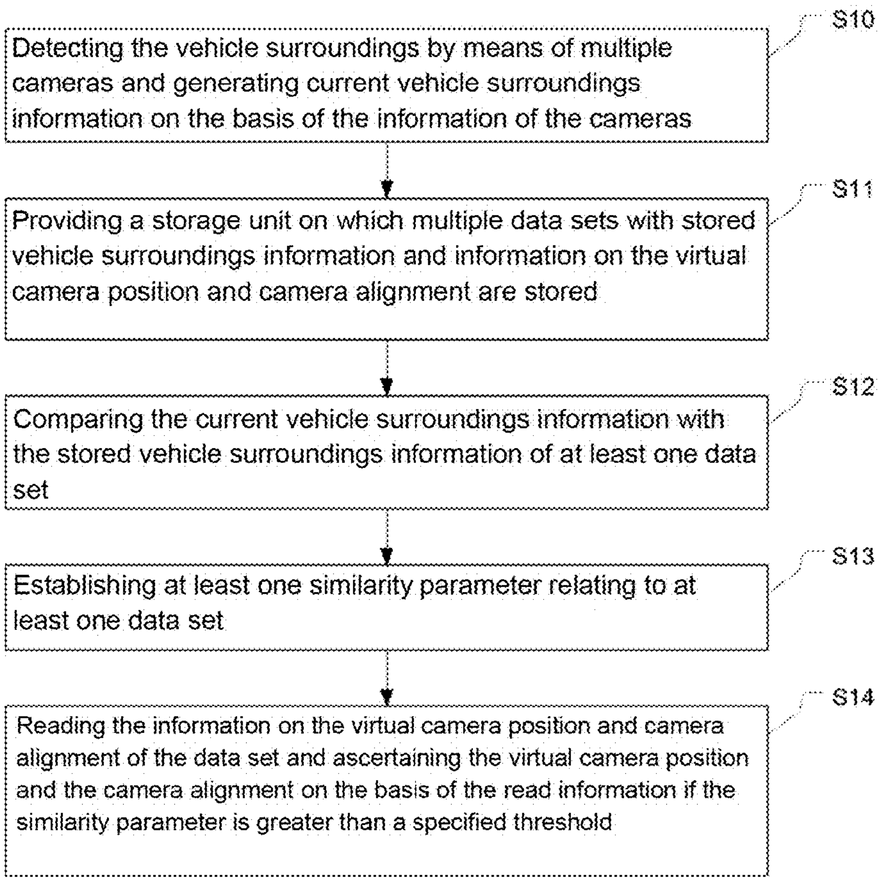
FIG. 4 shows a flowchart which illustrates the steps of the method for ascertaining the position and alignment of a virtual camera for perspectively representing surroundings information of the vehicle.

FIG. 4 shows a block diagram which illustrates the steps of the method for ascertaining the position and alignment of the virtual camera.

Initially, the vehicle surroundings are detected by means of multiple cameras of the vehicle and current vehicle surroundings information is generated on the basis of the information of the cameras (S10).

Furthermore, a storage unit on which multiple data sets are stored is provided. The data sets each comprises stored vehicle surroundings information which has been detected by means of multiple cameras of the vehicle. In addition, the data sets comprise information on the virtual camera position and camera alignment which is assigned to this stored vehicle surroundings information (S11).

Subsequently, the current vehicle surroundings information is compared with the stored vehicle surroundings information of at least one data set (S12).

Thereafter, at least one similarity parameter relating to at least one data set is established. The similarity parameter indicates, in each case, the degree of similarity of the current vehicle surroundings information to the stored vehicle surroundings information of the respective data set (S13).

If the similarity parameter is greater than a specified threshold, information on the virtual camera position and camera alignment of the data set which contains the stored vehicle surroundings information is read. The virtual camera position and the camera alignment are ascertained on the basis of the read information on the virtual camera position and camera alignment (S14).

The present disclosure has been described above using example embodiments. It is understood that numerous changes as well as modifications are possible without leaving the scope of protection defined by the claims.

LIST OF REFERENCE NUMERALS

1 Vehicle
2 Display unit
3 Camera
4 Storage unit
5 Computing unit
6 Positioning system
7 Surroundings recognition system
8 3D surround view system

The invention claimed is:

1. A method for ascertaining a virtual camera position and camera alignment in order to allow the surroundings of a vehicle to be represented on a display of the vehicle on the basis of the virtual camera position and camera alignment, wherein the method comprises:

utilizing a computing unit for performing the following steps:

detecting the vehicle surroundings by multiple cameras of the vehicle and generating current vehicle surroundings information on the basis of the information of the cameras;

providing memory on which multiple data sets are stored, wherein the data sets each comprises stored vehicle surroundings information which has been detected by multiple cameras of the vehicle, and comprises information on the virtual camera position and camera alignment assigned to the stored vehicle surroundings information;

comparing the current vehicle surroundings information with the stored vehicle surroundings information of at least one data set of the multiple data sets;

establishing at least one similarity parameter relating to at least one data set, wherein the at least one similarity parameter indicates, in each case, a degree of similarity of the current vehicle surroundings information to the stored vehicle surroundings information of the respective data set;

if the at least one similarity parameter is greater than a specified threshold, reading the information on the virtual camera position and camera alignment of the data set which contains the stored vehicle surroundings information, and ascertaining the virtual camera position and the camera alignment on the basis of the read information on the virtual camera position and camera alignment.

2. The method according to claim 1, wherein comparing the current vehicle surroundings information with the stored vehicle surroundings information comprises determining image similarities and matching image features between the current vehicle surroundings information and the stored vehicle surroundings information.

3. The method according to claim 1, further comprising establishing multiple similarity parameters regarding multiple different data sets, a maximum similarity parameter is determined which indicates a greatest correspondence between the current vehicle surroundings information and the stored vehicle surroundings information, in that the maximum similarity parameter is used to compare thresholds, and in that the information on the virtual camera position and camera alignment of the data set which contains the stored vehicle surroundings information which led to the maximum similarity parameter is read.

4. The method according to any claim 1, wherein the data sets each has position-related surroundings information and, by comparing the current vehicle surroundings information with the stored vehicle surroundings information, the method further comprises establishing the at least one similarity parameter, comparing the at least one similarity parameter with the specified threshold, determining whether the vehicle is located in a vehicle position regarding which the virtual camera position and camera alignment have already been ascertained.

5. The method according to claim 1, wherein the vehicle has a sensor-based positioning system and the data sets each has position data provided by the positioning system which indicate a geographical position in which the respective stored vehicle surroundings information has been detected.

6. The method according to claim 5, wherein position information is determined by the sensor-based positioning system, the determined position information is compared with the position data stored in the data sets and in that, by comparing said position information with the position data stored in the data sets, the number of data sets for which a determination of a similarity parameter is to be carried out in each case is restricted.

7. The method according to claim 1, wherein a computing unit of the vehicle generates, from the information provided by the cameras on the basis of the virtual camera position and the camera alignment, three-dimensional surroundings information which is represented on the display of the vehicle as spatially perspective surroundings information.

8. The method according to claim 7, wherein the spatially perspective surroundings information contains a perspective view of the vehicle itself.

9. A system comprising multiple cameras distributed around a vehicle, a computing unit comprising a processor for processing the information which is provided by the cameras, a storage and a display which is configured to represent surroundings information of the vehicle, wherein the computing unit is configured to perform:

detecting the vehicle surroundings by multiple cameras of the vehicle and generating current vehicle surroundings information on the basis of the information of the cameras;

storing multiple datasets in the storage, wherein the data sets each comprises stored vehicle surroundings information which has been detected by multiple cameras of the vehicle, and comprises information on the virtual camera position and camera alignment assigned to the stored vehicle surroundings information;

comparing the current vehicle surroundings information with the stored vehicle surroundings information of at least one data set;

establishing at least one similarity parameter relating to at least one data set, wherein the similarity parameter indicates, in each case, a degree of similarity of the current vehicle surroundings information to the stored vehicle surroundings information of the respective data set; and if the similarity parameter is greater than a specified threshold, reading the information on the virtual camera position and camera alignment of the data set which contains the stored vehicle surroundings information, and ascertaining the virtual camera position and the camera alignment on the basis of the read information on the virtual camera position and camera alignment.

10. The system according to claim 9, wherein the computing unit is configured to compare the current vehicle surroundings information with the stored vehicle surroundings information, to determine image similarities and to match image features between the current vehicle surroundings information and the stored vehicle surroundings information.

11. The system according to claim 9, wherein the computing unit is configured to establish multiple similarity parameters regarding multiple different data sets, to determine a maximum similarity parameter which indicates a greatest correspondence between the current vehicle surroundings information and the stored vehicle surroundings information, to use the maximum similarity parameter to compare thresholds and to read the information on the virtual camera position and camera alignment of the data set which contains the stored vehicle surroundings information which led to the maximum similarity parameter.

12. The system according to claim 9, wherein the vehicle has a sensor-based positioning system and the computing unit is configured to store position data provided in each case by the positioning system in the data sets, which position data indicate the geographical position in which the respective stored vehicle surroundings information has been detected.

13. The system according to claim 12, wherein the sensor-based positioning system is configured to determine geographical position information, and the computing unit is configured to compare the geographical position information with the position data stored in the data sets and, by comparing the position information with the position data stored in the data sets, to restrict the data sets for which a determination of a similarity parameter is carried out in each case.

14. The system according to claim 9, wherein the computing unit is configured to generate, from the information provided by the cameras on the basis of the virtual camera position and the camera alignment, three-dimensional surroundings information which is represented on the display of the vehicle as spatially perspective surroundings information.

15. The system according to claim 14, wherein the computing unit is configured to represent a perspective view of the vehicle itself in the spatially perspective surroundings information.

* * * * *